(12) United States Patent
Kim

(10) Patent No.: US 7,014,740 B2
(45) Date of Patent: Mar. 21, 2006

(54) BROWN GAS MASS PRODUCTION APPARATUS INCLUDING A LINE STYLE ELECTROLYTIC CELL

(76) Inventor: Sang-Nam Kim, 202-104, Hyundae Apt. 23-3 Cheongdam-Dong, Kangnam-ku, Seoul (KR) 135-102

(*) Notice: Subject to any disclaimer, the term of this patent is extended or adjusted under 35 U.S.C. 154(b) by 247 days.

(21) Appl. No.: 10/316,397

(22) Filed: Dec. 11, 2002

(65) Prior Publication Data
US 2004/0112739 A1 Jun. 17, 2004

(51) Int. Cl.
C25B 1/06 (2006.01)
C25B 9/00 (2006.01)

(52) U.S. Cl. .................. 204/278.5; 204/275.1; 204/242; 205/628

(58) Field of Classification Search .......... 204/253, 204/258, 266, 278.5; 205/628
See application file for complete search history.

(56) References Cited

U.S. PATENT DOCUMENTS

| | | | |
|---|---|---|---|
| 4,081,656 A | | 3/1978 | Brown .................. 219/137.31 |
| 4,399,020 A | * | 8/1983 | Branchick et al. .......... 204/269 |
| 5,753,096 A | * | 5/1998 | Zecher ........................ 205/145 |
| 5,993,618 A | * | 11/1999 | Schulze et al. .............. 204/237 |
| 6,630,061 B1 | * | 10/2003 | Lee et al. .................. 204/270 |

FOREIGN PATENT DOCUMENTS

| | | |
|---|---|---|
| JP | 3130014 | 11/2000 |
| KR | 275504 | 4/2001 |

OTHER PUBLICATIONS

Derwent abstract of JP 2000-129480 A.*

* cited by examiner

Primary Examiner—Roy King
Assistant Examiner—Harry D. Wilkins, III
(74) Attorney, Agent, or Firm—Pendorf & Cutliff

(57) ABSTRACT

Disclosed is a Brown gas mass production apparatus having a line style electrolytic cell in which an electrolytic cell case having an electrolyte distribution and discharging pipe mounted on the inside bottom surface thereof is coated with insulation material on the inner surface thereof, electrode units are disposed by two or three groups in a side-by-side arrangement in the electrolytic cell case, an electrolytic cell upper plate having gas outlet nipples mounted thereon is sealingly coupled to the top surface of the cell case to form a secured sealing between edges of the upper plate and the cell case. The line style electrolytic cell further includes an auxiliary electrolyte tank connected to the electrolytic cell case for maintaining the surface of the electrolyte at a predetermined level just above the top surface of the electrode units in the electrolytic cell according to the operation of a solenoid valve, so that water is automatically fed into the electrolytic cell according to the opening and closing operation of a solenoid valve operated by a level sensor installed in the auxiliary electrolyte tank, and a relatively large horizontal space is formed just above the top surface of the electrode units, so that gas and water are separated directly at the horizontal space.

4 Claims, 7 Drawing Sheets

BROWN GAS MASS PRODUCTION APPARATUS INCLUDING A LINE STYLE ELECTROLYTIC CELL

BACKGROUND OF THE INVENTION

1. Field of the Invention

The present invention relates to a Brown gas mass production apparatus including a line style electrolytic cell. This is an essential component to use Brown gas as fuels in industrial boilers, furnaces, and so on, and more particularly, to a Brown gas mass production apparatus including a line style electrolytic cell in which insulation bars are interposed between (−) and (+) electrode plates in order to enhance the total electrolysis efficiency. The (−) and (+) electrode plates are crosswisely aligned to face each other in their half area, respectively, while also being lengthwisely alternately arranged to be overlappingly disposed to each other. They are then attached to a predetermined frame, constructed of left and right plates which are made of an insulation material, by securely fitting upper and lower fixing bars into generally square grooves of the left and right plates, such that the electrode plates can be formed integrally with the frame.

The line style electrolytic cell, according to the present invention, is characterized in that the electrolytic cell case that is coated with an insulation material includes two or three groups of the electrode units therein for directly carrying out the separation of gas and water on the top surfaces of the units of the electrode plates to desirably maintain an electrolyte at a predetermined level.

A Brown gas mass production apparatus, including a line style electrolytic cell, is also provided with a pressure automatic feed water device for maintaining the electrolyte at a predetermined level and with a forced electrolyte cooling and circulating device for maintaining the electrolyte at a constant temperature, thereby enabling Brown gas to be generated in large quantities.

2. Background of the Related Art

Electrochemistry which has its origin in an electrolysis technology started about 200 years ago. Since the basic laws of the electrochemistry and various terms and concepts related to the electrochemistry such as ions, cations, electrolyte or the like were established by Faraday in 1833, there has been no further development on the electrolysis technology.

After that, Dr. Yull Brown in Australia launched a research on the electrolysis of water in 1971. As a result, he invented a Brown gas generator, which is granted with U.S. Pat. No. 4,081,656 1978, and thus established theories regarding implosion properties and thermonuclear reaction characteristics of Brown gas.

However, the method of electrolyzing water has failed to be put to practical use because it is predominantly recognized as being not economical, such that it has been applied only for laboratory work like soldering or welding.

The present inventor met Dr. Brown, who lives on the outskirts of Sidney in Australia, in 1991 and after that, the inventor started to develop a Brown gas application technology, which becomes a fundamental study for treating water as fuel.

For the purpose of commercializing water as fuel, first of all, there is a need for improving the performance of a Brown gas generator as well as enlarging the capacity of the same. As a result, he had invented a Brown gas generator including a line style electrolytic cell, which was granted Korean Patent No. 275504 and Japanese Patent No. 3130014. This is presently being used in a Brown gas boiler, a Brown gas heater, a Brown gas-heating furnace, and especially a Brown gas combustion accelerating system such as a commercial gas-heating system into which a great amount of Brown gas is injected.

According to the Faraday's laws as mentioned above, when electric current passes through the interior of the electrolytic cell, the mass of chemical materials precipitated from electrodes is proportional to the quantity of the electric current passing through the interior of the cell. The mass of a material generated in a predetermined quantity by the electric current is proportional to the chemical equivalent of the material.

Like this, theoretically, the quantity of Brown gas generated at the time when the predetermined amount of the electric current is passed in the process of the water electrolysis, is proportional to the amount of electric current supplied. But experimentally, the gas generation efficiency of the Brown gas generator is substantially lowered to some extent according to the construction of the electrolytic cell and manner of configuring the gas generator. In the case of producing the Brown gas in large quantities, this is clearly proved, and therefore, it can be appreciated that we cannot expect to obtain a sufficient efficiency with conventional gas generators.

In other words, the efficiency of the electrolysis can be improved by various experiments and tests, but not by just theories.

A conventional electrolytic cell, including the electrolytic cell of Dr. Brown, has adopted several methods such as a method of simply arranging (+) and (−) electrode plates with them facing each other in multiple layers, which is only applied to a certain type of gas generator generating a relatively small quantity of gas, a method of disposing a plurality of electrolytic cells and connecting them to each other so as to generate a relatively large quantity of gas, a method of deeply submerging an electrode unit in electrolyte which is contained in the interior of the electrolytic cell, and a method of having an additional gas and water separating tank for gathering the gas built in a Brown gas generator.

In the case of such methods, while minutely observing the interior of the above-mentioned electrolytic cell through a transparent window, it can be found that gas bubbles developed when gas starts to be generated from a space where no electrolyte is contained between the respective electrode plates and on the top surface of the electrode unit. Thus, the large bubbles climb to the gas and water separating tank and are separated from water on the top surface of the electrolyte, so that the gas gathers there.

This method hinders the movement of bubbles because of a long distance between the electrode unit and the surface of the water from which gas is separated and water pressure, so that the time during which the bubbles are attached on the electrode plates is lengthened. This temporarily makes the occurrence of the electrolysis impossible at the predetermined portions on which the bubbles are attached. This causes efficiency of the gas generation to be substantially reduced.

An explanation on the schematic configuration of the above-mentioned "A Brown gas generator including a line style electrolytic cell" disclosed in the Korean Patent No. 275504, which has been previously registered by the present inventor and the Japanese Patent No. 3130014(hereinafter, referred to as "cited references") will be given hereinafter.

In the configuration, the Brown gas generating device according to the cited references includes: an electrolytic device in which an electrode unit is constructed in such a manner that lower fixing bars are fixedly inserted into a plurality of indented grooves formed at predetermined intervals on a pair of bases. A plurality of generally rectangular electrode plates are inserted into insertion grooves formed on the top surface of the lower fixing bars, in a horizontal direction, and the electrode plates are inserted into insertion grooves formed on the bottom surface of the upper fixing bars. Then, stay bolts are engageably coupled to bolt holes formed on both sides of the bases and the fixing bars so as to form the lower and upper fixing bars and the electrode plates as an integrated single piece. Then an electrolyte cooling device in which a gas ascending pipe and an electrolyte descending pipe are curved in zigzag shapes in a predetermined length so as to be fixedly coupled on their both sides by means of a pin tube and in the middle of the interior side thereof is mounted a cooling fan; a gas gathering tank, having a narrower width on the upper portion thereof and a wider width on the lower portion thereof, and having a level sensor installed therein. The gas ascending pipe connected to the electrolytic device is installed on the lower portion of one side thereof, an exhausting pipe is installed on the upper portion thereof, and the electrolyte descending pipe connected to a certain portion of a feed water pipe is installed on the lower portion of the other side thereof. A feed water tank being narrow on left side thereof and being wide on right side thereof and connected to the exhausting pipe, in which an exhausting pipe and the discharging pipe are fixed to the upper portion thereof and the feed water pipe is mounted on the lower portion thereof, the feed water pipe being coupled to a lower electrolyte tank.

As can be seen from the conventional electrode unit disclosed in cited references, the electrode unit does not have any insulation bar interposed between the electrode plates and is also configured to fix the upper and lower fixing bars only by using stay bolts, without any side plates, which makes the sides thereof completely opened so that an insulation is not accomplished. This results in the loss of an electric current, and thus, an electrolysis efficiency is considerably reduced.

More particularly, the electrode unit is installed deeply into the electrolytic device and since the surface of electrolyte exists in the gas gathering tank, the bubbles of the Brown gas generated between the electrode plates ascend the gas ascending pipe and enter into the gas gathering tank to be separated into gas and water. However, this process is complicated and, since a predetermined water pressure exists in the electrode unit, the staying time of the bubbles generated between the electrode plates becomes longer, thereby greatly reducing electrolysis efficiency.

SUMMARY OF THE INVENTION

To solve the above problems, the present inventor has made various studies. And as a result, he has found that the height of the surface of the electrolyte in a line style electrolytic cell has great influence on the amount of gas generation, and if the electrolytic cell case is made of an insulation material, electrolysis efficiency can be improved. Accordingly, the present invention is, as being different from the cited references, to provide a Brown gas mass production apparatus including a line style electrolytic cell wherein the top surface of the electrode unit is opened to make bubbles flow at a relatively rapid speed such that electrolysis efficiency can be more improved.

Another object of the present invention is to provide a Brown gas mass production apparatus including a line style electrolytic cell wherein the electrolytic cell case, the side plates of the electrode unit and the insulation bars are molded by an insulation material, thereby improving electrolysis efficiency, and the side plates and the insulation bars are provided, thereby enhancing efficiency in an assembling work.

Still another object of the present invention is to provide a Brown gas mass production apparatus including a line style electrolytic cell in which an automatic feed water device, a forced electrolyte circulating and cooling device and an electrolyte distributing and discharging pipe are efficiently disposed as auxiliary devices for the purpose of maintaining the surface of the electrolyte constantly and promoting a smooth discharge of the gas, thereby generating a large quantity of Brown gas.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to an aspect of the present invention, there is provided a Brown gas mass production apparatus including a electrolytic cell which generates Brown gas in large quantities via water electrolysis, the apparatus comprising: a line style electrolytic cell including an electrolytic cell case 11 having an electrolyte distribution and discharging pipe provided on the inside bottom surface thereof, the electrolytic cell case being coated with insulation material on the inner surface thereof, electrode units disposed by at least two groups in a side-by-side arrangement in the electrolytic cell case, an electrolytic cell upper plate having gas outlet nipples mounted thereon and sealingly coupled to the top surface of the cell case to form a secured sealing between edges of the upper plate and the cell case, and an auxiliary electrolyte tank connected to the electrolytic cell case and adapted to maintain the surface level of the electrolyte contained therein identical to that of the electrolyte contained in the electrolytic cell case; a forced electrolyte circulating and cooling device connected to the line style electrolytic cell and adapted to maintain the temperature of the electrolyte below a predetermined temperature; and an automatic feed water device adapted to continuously feed supplementary water to the interior of the electrolytic cell in response to the operation of the auxiliary electrolyte tank.

According to the present invention, the electrode units are disposed in the electrolytic cell case, the automatic feed water device is operated according to the lever sensor installed in the auxiliary tank connected to the electrolytic cell in order to maintain the surface of the electrolyte at a predetermined level such that a relatively large horizontal space is formed just above the top surfaces of the electrode units. The forced electrolyte cooling and circulation device serves to maintain the electrolyte at a predetermined temperature. The electrolyte distributing and discharging pipe serves to accelerate the flow of the bubbles, and a backfire preventing device serves to prevent the backfire of the Brown gas generated from the horizontal space in the electrolytic cell case, such that the Brown gas can be stably supplied to a burner.

The electrode unit is configured in such manners that upper and lower fixing bars are coupled to the side plates as frames made of an insulation material by means of stud bolts, (+) and (−) electrode plates are disposed between the upper and under fixing bars, while insulation bars are interposed between the electrode plates, so that the (−) and (+) electrode plates are crosswisely aligned to face each other in their half area, respectively, while also being lengthwisely alternately aligned to be overlappingly disposed to each other.

It is to be understood that both the foregoing general description and the following detailed description of the present invention are exemplary and explanatory and are intended to provide further explanation of the invention as claimed.

BRIEF DESCRIPTION OF THE DRAWINGS

Further objects and advantages of the invention can be more fully understood from the following detailed description taken in conjunction with the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

Figure 1:
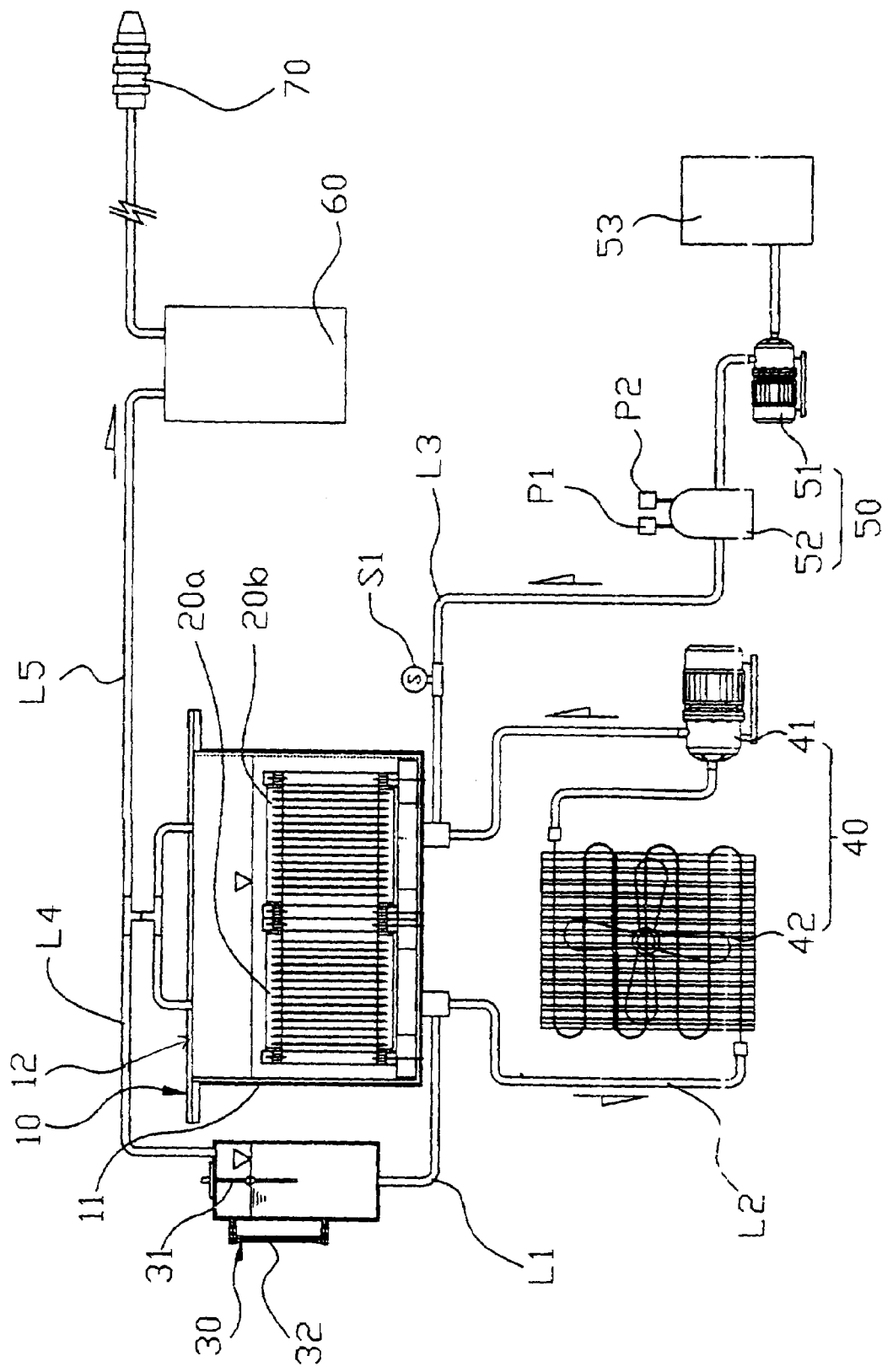
FIG. 1 is a systematic view illustrating the whole configuration of a Brown gas mass production apparatus including a line style electrode cell according to the present invention.
Figure 2:
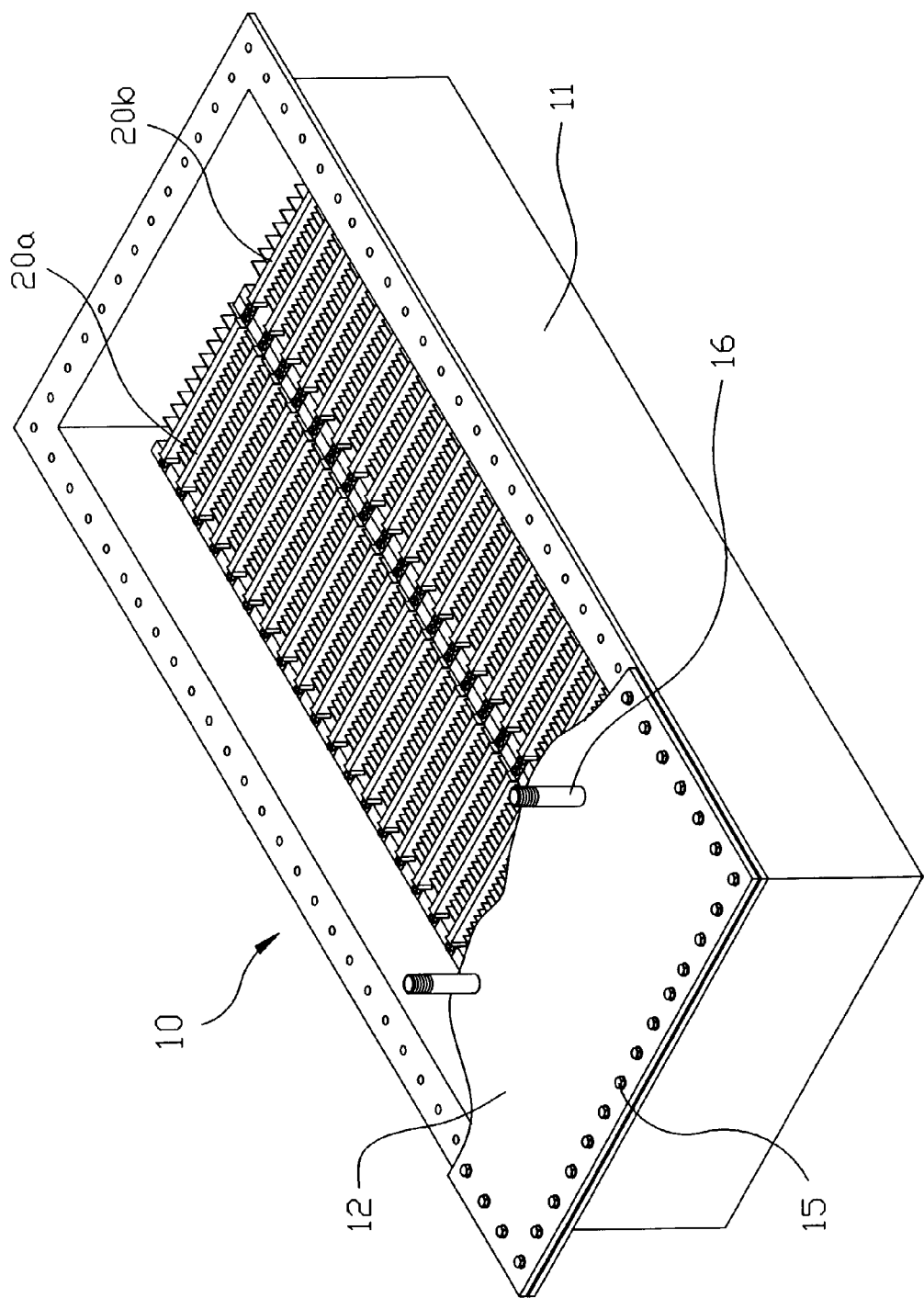
FIG. 2 is a perspective view illustrating an electrolytic cell case having a electrode unit installed therein according to the present invention.
Figure 3:
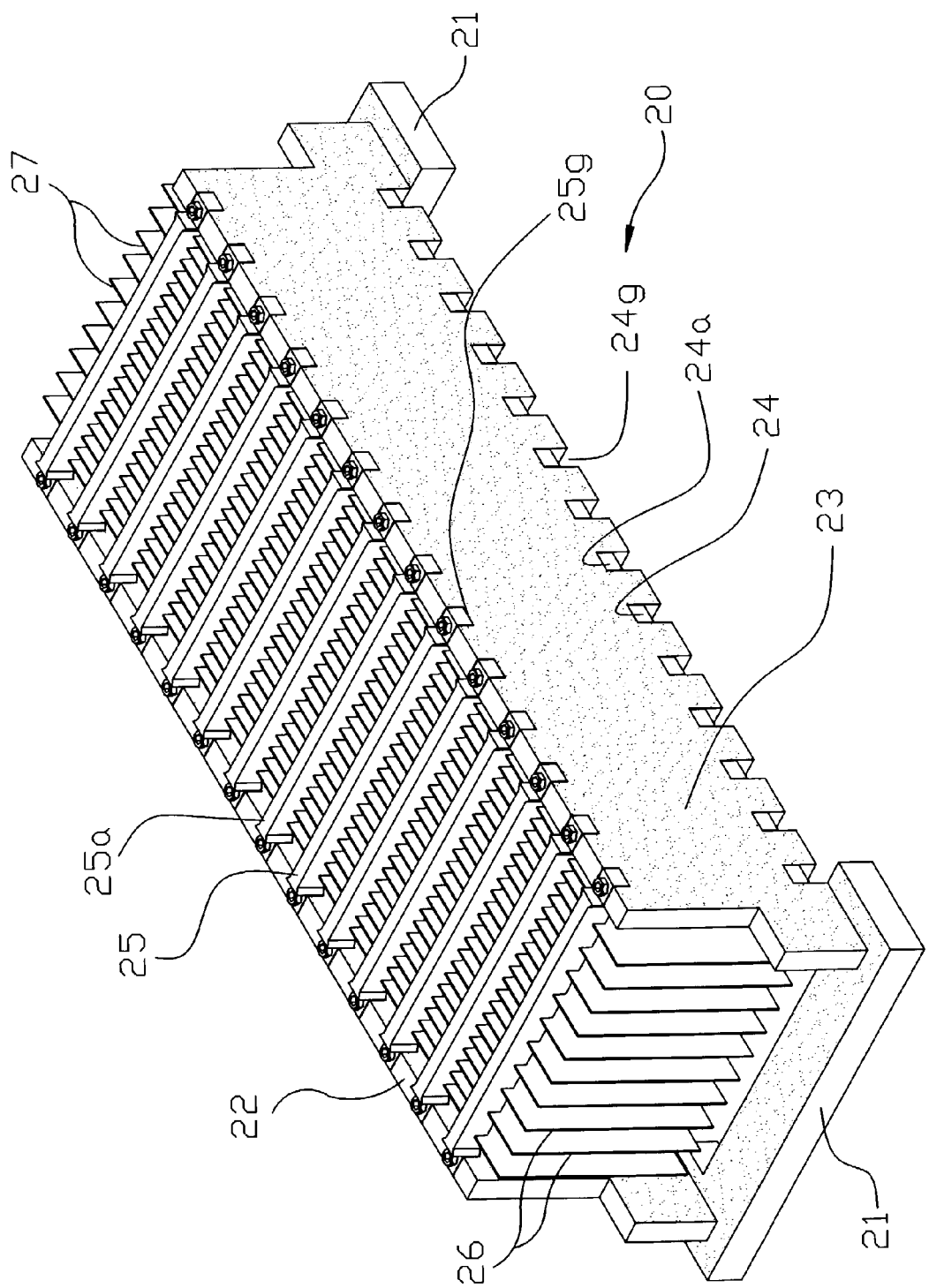
FIG. 3 is a perspective view illustrating the whole configuration of the electrode unit in an assembled state according to the present invention.
Figure 4:
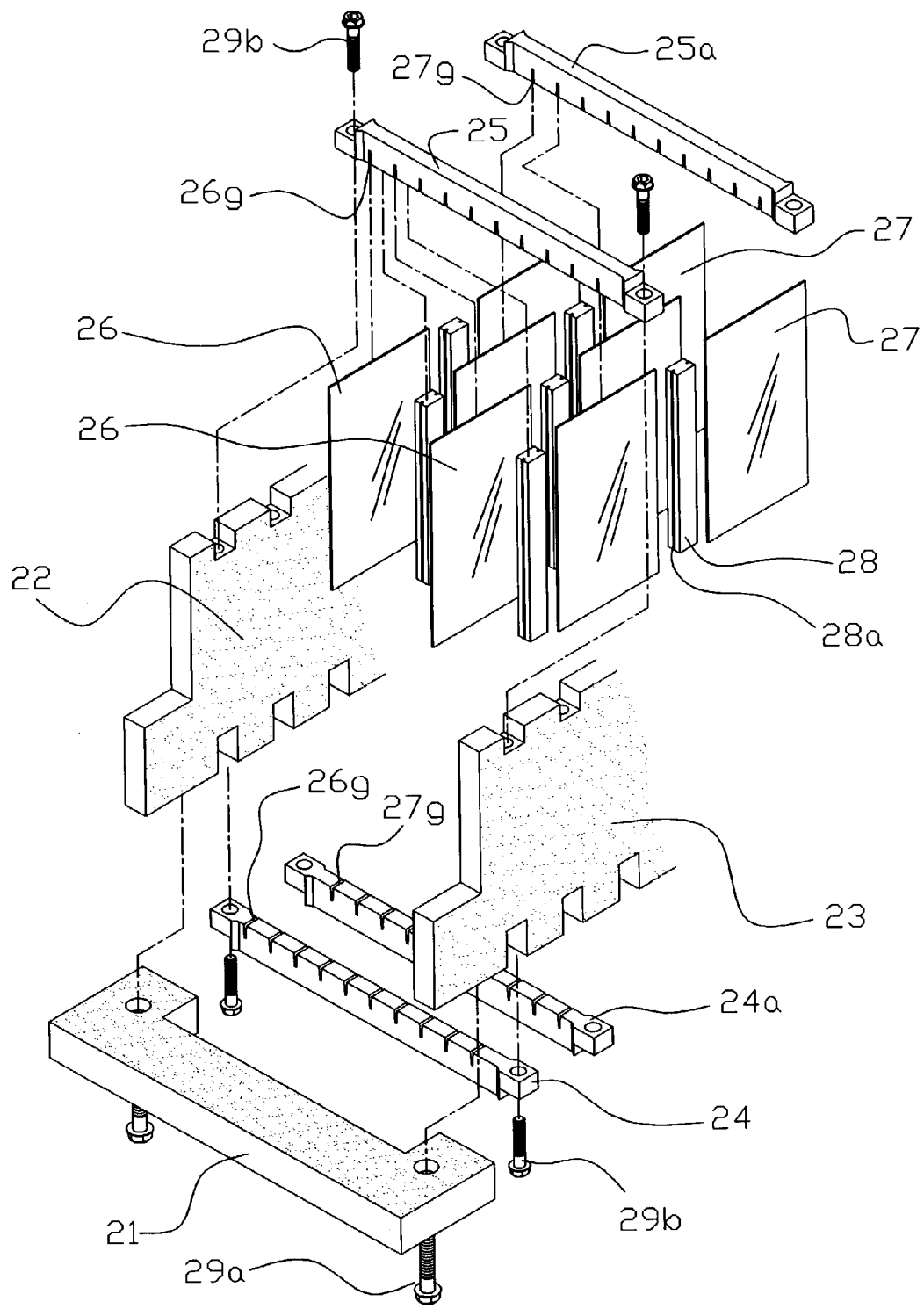
FIG. 4 is an exploded perspective view of the electrode unit of FIG. 3.
Figure 5:
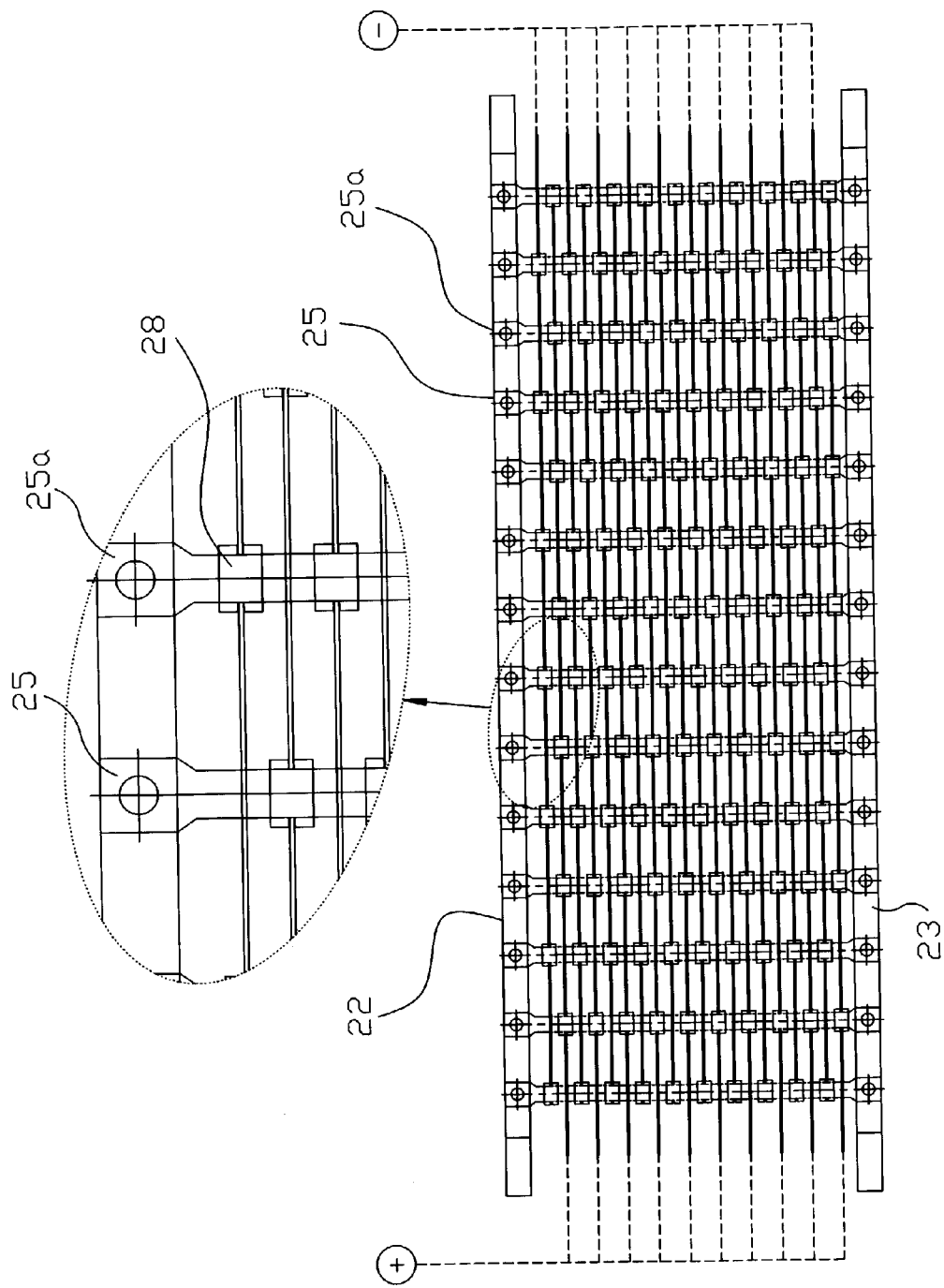
FIG. 5 is a plan view illustrating the connection state of the electrode unit with a power supply.
Figure 6:
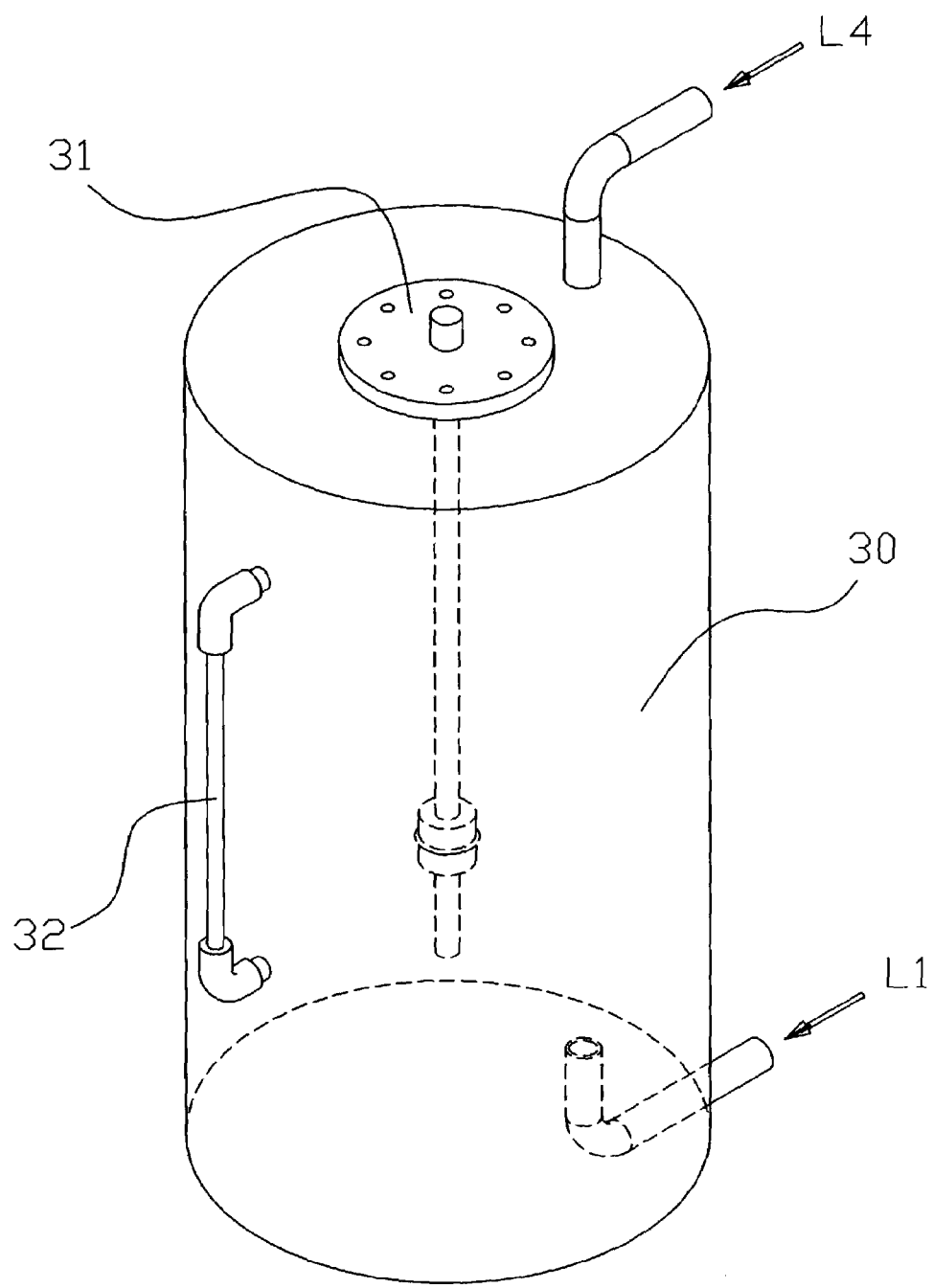
FIG. 6 is a perspective view illustrating an auxiliary tank having a level sensor installed therein.
Figure 7:
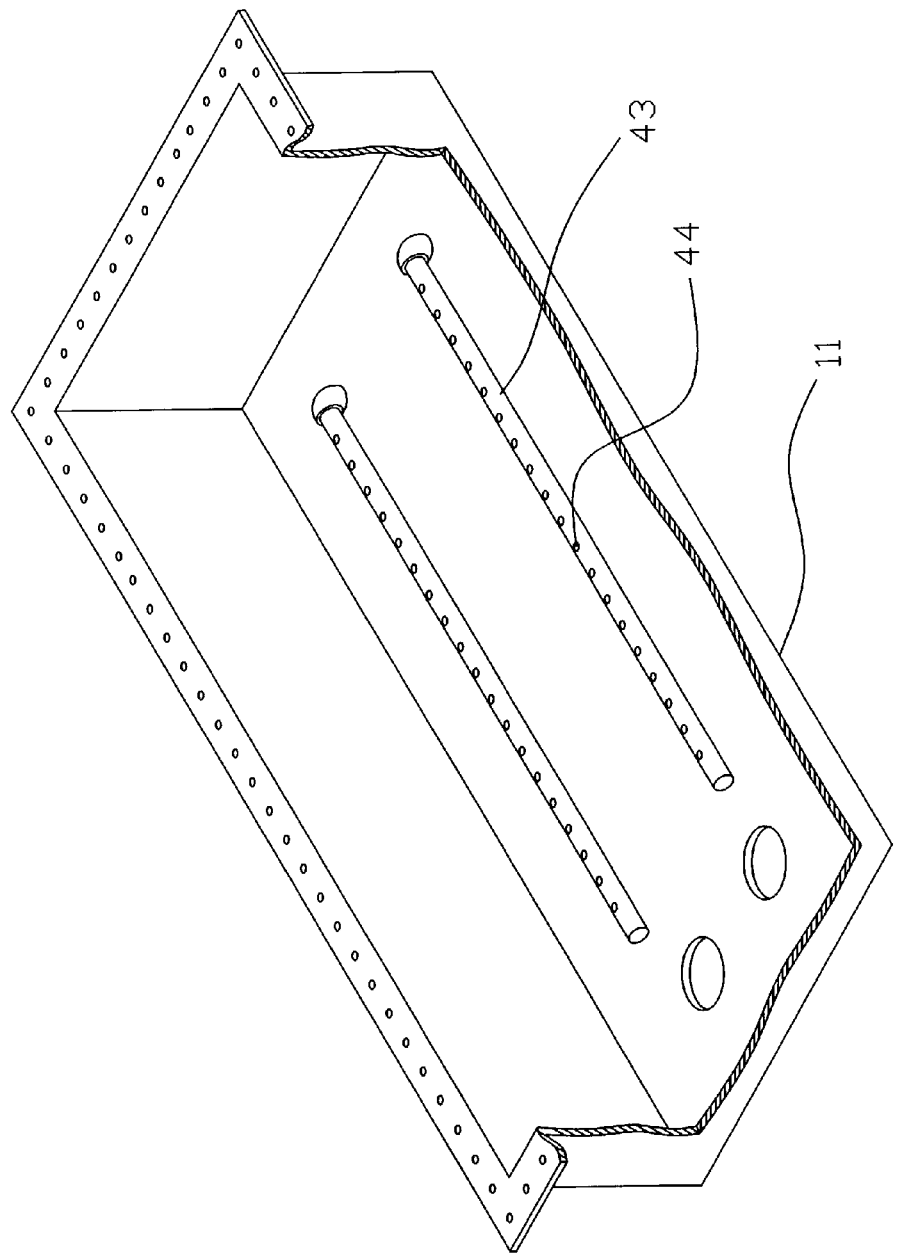
FIG. 7 is a perspective view illustrating an electrolyte discharging pipe.

FIG. 1 is a systematic view illustrating the whole configuration of a Brown gas mass production apparatus, including a line style electrode cell according to the present invention. FIG. 2 is a perspective view illustrating an electrolytic cell case having built-in electrode units that is one component of the present invention. FIG. 3 is a perspective view illustrating the whole configuration of the electrode unit in an assembled state according to the present invention. FIG. 4 is an exploded perspective view of the electrode unit of FIG. 3. FIG. 5 is a plan view illustrating the connection state of the electrode unit with a power supply. FIG. 6 is a perspective view illustrating an auxiliary tank having a level sensor installed therein. FIG. 7 is a perspective view illustrating an electrolyte discharging pipe.

As shown in FIGS. 1 to 7, there is provided a Brown gas mass production apparatus according to the present invention. The Brown gas mass production apparatus includes: a line style electrolytic cell 10 that is provided with an electrolytic cell case 11 having an electrolyte distribution and discharging pipe 43 provided on the inside bottom surface thereof, the electrolytic cell case 11 being coated with an insulation material on the inner surface thereof, electrode units 20 disposed by two or three groups in a side-by-side arrangement in the electrolytic cell case 11 according to the amount of gas production, an electrolytic cell upper plate 12 having gas outlet nipples 16 mounted thereon and sealingly coupled to the top surface of the cell case by means of flange bolt nuts 15 to form a secured sealing between edges of the upper plate and the cell case, and an auxiliary electrolyte tank 30 with a level sensor 31 to which an electrolyte pipeline L1 and a gas pipeline L4 are connected and which is connected to the electrolyte cell case, the electrolyte pipeline L1 and the gas pipeline L4 being connected to the electrolyte cell case; a forced electrolyte circulating and cooling device 40; an automatic feed water device 50 operated in response to a signal outputted from the level sensor of the auxiliary electrolyte tank; and a Brown gas supply line L5 through which Brown gas that is generated in large quantities inside the electrolytic cell 10 passes to supply it to a burner 70 via a backfire prevention device 60.

As shown in FIGS. 3 to 5, the electrode unit 20, which is installed inside the electrolytic cell case 11, is structured in such a manner that side plates 22 and 23 having wide width and generally square grooves 25g and 24g formed at equal intervals on the top and bottom surfaces thereof are installed on the left and right sides, on a base plate 21 having a predetermined height, so that upper and lower fixing bars 25 and 24 can be securely fitted into the square grooves 25g and 24g, respectively.

The assembling process of the upper and lower fixing bars 25 and 24 and the square grooves 25g and 24g is performed by the following steps: The upper and lower fixing bars 25 and 24 are securely fitted into the square grooves 25g and 24g formed on the top and bottom surfaces of the left and right side plates 22 and 23 by one, respectively. Then, the next upper and lower fixing bars 25 and 24 are securely fitted into the next grooves, while being rotated at an angle of 180°. The above fixing bar-fitting processes are alternately performed.

Also, the upper and lower fixing bars 25 and 24 have electrode plate-inserting indented grooves 26g and 27g formed thereon for installing (+) electrode plates 26 and (−) electrode plates 27, and are securely fitted into the square grooves 25g and 24g formed on the left and right side plates 22 and 23 to be fixedly coupled to the side plates by means of stud bolts 29b, so that they can be formed integrally with the side plates 22 and 23.

The upper and lower fixing bars 25 and 24 and the side plates 22 and 23 are formed of insulation material such as synthetic resin for preventing the leakage of electric current, so that an electrolysis efficiency can be improved and an assembling work of other components can be executed easily and efficiently. The electrode plates 26 and 27 is assembled in such a manner that the (+) electrode plates 26 and the (−) electrode plates 27 are securely fitted into the indented grooves 26g and 27g of the upper and lower fixing bars 25 and 24, respectively, while insulation bars 28 are interposed between the electrode plates, so that the electrode plates are formed integrally with the insulation bars. As a result, the (+) electrode plates 26 and the (−) electrode plates 27 are crosswisely aligned to face each other in their half area, respectively, while also being lengthwisely alternately aligned to be overlappingly disposed to each other.

The insulation bar 28 is formed of the insulation material and has relatively long insertion grooves 28a formed on both sides thereof, so that the corresponding electrode plates can be securely fitted into the insertion grooves, thereby also improving electrolysis efficiency.

The auxiliary electrolyte tank 30, which is additionally included in the electrolytic cell 10 for detecting the level of an electrolyte contained in the electrolytic cell case 11, has a level gauge or a liquid level meter 32 attached to one side of the outer wall thereof so as to visually check the level of the electrolyte from the outside and a level sensor 31 built therein so as to automatically feed water into the electrolytic cell to thereby maintain water at a predetermined level.

The forced electrolyte circulating and cooling device 40, which has a circulating pump 41, a cooler 42 and a discharge pipe 43, is connected to the bottom portion of the electrolyte cell case 11 through a pipeline L2 for forcedly circulating and cooling the electrolyte. Especially, the electrolyte distributing and discharging pipe 43 is disposed at the lower portion of the electrode unit 20 for ejecting the electrolyte through a plurality of ejection holes 44 which are formed at the upper portion thereof. This makes the bubbles generated between the electrode plates flowing at a rapid speed, thereby enhancing electrolysis efficiency.

The automatic feed water device 50 has a feed water pump 51, a pressure tank 52, a purifying tank 53 and a solenoid valve 51 that are connected to the electrolytic cell 11 through a line L3. Also, the automatic feed water device 50 allows the feed water pump 51 to be operated automatically by means of an upper limit pressure switch P1 and a lower limit pressure switch P2 that are additionally attached to the pressure tank 52 so as to maintain a predetermined pressure level within the pressure tank, and feeds the supplementary water to the electrolytic cell under the pressure higher than that existing in the electrolytic cell according to the operations ("opening"/"closing") of the solenoid valve S1 that is operated by the level sensor 31 installed in the auxiliary electrolyte tank 30.

Accordingly, the Brown gas that is gathered on the top surface of the electrolyte that is formed just over the electrode unit 20 in the interior of the electrolyte cell case 11 passes through the backfire prevention device 60 along the pipeline L5 connected to the gas outlet nipples 16 on the electrolyte cell upper plate 12 and then is supplied to the burner 70.

As set forth in the foregoing, there is provided the Brown gas mass production apparatus including the line style electrolytic cell in which the electrolytic cell case is coated with insulation material on the inner walls thereof, the insulation bar is interposed between the electrode plates, and the side plates of the electrolyte unit are formed of the insulation material, thereby preventing the leakage of electric current to improve electrolytic efficiency. Also, the insulation bar serves to fix the electrode plates, while maintaining the interval between the electrode plates at a predetermined distance, which enables the assembling work to be easily carried out, and the side plates have such a relatively wide width that they form frames to which the upper and lower fixing bars are securely fixed to be integrally formed therewith, thereby improving durability of the electrode unit and efficiency in the assembling work.

According to the Brown gas mass production apparatus of the present invention, the number of electrode plates is more increased, even though the area of the unit electrode plate is somewhat reduced, such that the total area of the electrode plates becomes increased to make it possible to produce a great large amount of Brown gas. Further, the electrode plates that are installed vertically are opened on the upper portion thereof to form a large horizontal space thereon, which enables keeping the level of the electrolyte not high, thereby improving electrolysis efficiency.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A brown gas mass production apparatus including an electrolytic cell which generates brown gas in large quantities via water electrolysis, the apparatus comprising:
   a line style electrolytic cell including an electrolytic cell case (11), wherein the electrolytic cell case includes a top surface, a bottom surface, an inside section, an outside section, an electrolyte distribution, and a discharging pipe on the inside bottom surface thereof, wherein the electrolytic cell case is coated with an insulation material on the inner surface thereof,
   electrode units disposed by at least two groups in a side-by-side arrangement in the electrolytic cell case,
   an electrolytic cell upper plate having gas outlet nipples mounted thereon and sealed, coupled to the top surface of the cell case to form a secured sealing between edges of the upper plate and the cell case,
   an auxiliary electrolyte tank connected to the electrolytic cell case, wherein the auxiliary tank maintains the surface level of the electrolyte contained therein identical to that of the electrolyte contained in the electrolytic cell case;
   a forced electrolyte circulating and cooling device connected to the line style electrolytic cell to maintain the temperature of the electrolyte below a predetermined temperature; and
   an automatic feed water device to continuously feed supplementary water to the interior of the electrolytic cell in response to the operation of the auxiliary electrolyte tank;
   wherein the electrode unit comprises:
   a left and a right side plate mounted on a base plate,
   an upper and lower fixing bar fixedly coupled to square grooves formed at equal intervals on the top and bottom surfaces of the side plates by means of stud bolts,
   (+) electrode plates securely fitted into a plurality of insertion indented grooves formed at equal intervals on the bottom and top surfaces of the upper and lower fixing bars and crosswisely aligned while the insulation bars being interposed therebetween,
   (−) electrode plates securely fitted into the insertion indented grooves formed at equal intervals on the bottom and top_surfaces of the next upper and lower fixing bars with them being rotated at an angle of 180° and crosswisely aligned while insulation bars are interposed therebetween,
   wherein the (+) and (−) electrode plates are crosswisely aligned to face each other in their half area, respectively while also being lengthwisely alternately aligned to be overlappingly disposed to each other.

2. The brown mass production apparatus according to claim 1, wherein the auxiliary electrolyte tank serves to maintain the surface of the electrolyte at a predetermined level just above the surface of the electrode units in the electrolytic cell case and wherein the auxiliary electrolytic tank has a level sensor to automatically feed water into the electrolytic cell according to the opening and closing operation of a solenoid valve operated by the level sensor, and
   wherein a relatively large horizontal space is formed just above the top surface of the electrode units, so that gas and water are separated directly at the horizontal space.

3. The brown mass production apparatus according to claim 1, wherein the insulation bars have electrode plate insertion grooves formed on both sides thereof, and wherein the electrode plates are securely fittted into the insertion grooves.

4. The brown gas mass production apparatus according to claim 1, wherein the electrolyte cooling and circulating device further comprises:
   an electrolyte circulating pump,
   a cooler, and
   a discharging pipe connected to the bottom surface of the electrolyte cell case through a pipeline, and wherein the discharge pipe is disposed at the lower portion of the electrode unit for ejecting the electrolyte through a plurality of ejection holes that are formed on the upper portion thereof, such that the bubbles generated between the electrode plates of the electrode unit flow at a rapid speed.

* * * * *